US005737803A

United States Patent [19]

Tisdale

[11] Patent Number: 5,737,803
[45] Date of Patent: Apr. 14, 1998

[54] ERGONOMIC HANDLE FOR KITCHEN ARTICLES

[75] Inventor: David Tisdale, New York, N.Y.

[73] Assignee: Lechters, Inc., Harrison, N.J.

[21] Appl. No.: 720,169

[22] Filed: Sep. 25, 1996

[51] Int. Cl.$^6$ .................................................. A47J 45/10
[52] U.S. Cl. .......................... 16/111 R; 16/DIG. 12; D7/395; D8/107
[58] Field of Search .................... 16/111 R, 110 R, 16/114 R, DIG. 12, DIG. 19; 482/44, 49, 50, 62; 76/106, 119; 82/177.1, 489; D7/688, 691, 368, 369, 393, 395; D8/107

[56] References Cited

U.S. PATENT DOCUMENTS

| D. 191,878 | 12/1961 | Hvale et al. | D7/395 |
|---|---|---|---|
| D. 201,565 | 7/1965 | Hvale | D7/395 |
| D. 263,920 | 4/1982 | Usbeck | D7/395 |
| D. 312,749 | 12/1990 | Kessler | D7/395 |
| D. 331,171 | 11/1992 | Berthet | D7/395 |
| 4,926,521 | 5/1990 | Gagnepain | 16/110 A |

FOREIGN PATENT DOCUMENTS

| 0240225 | 10/1987 | European Pat. Off. | D7/395 |

Primary Examiner—Chuck Y. Mah
Attorney, Agent, or Firm—M. K. Silverman

[57] ABSTRACT

An ergonomic handle for kitchen articles includes a hollow elongate body having a longitudinal axis, the body having a first end for providing attachment and connection of the kitchen articles into a hollow interior of the body, and which includes a second or free end. The elongate body of the kitchen handle includes a top face including a substantially oval recess proportioned for receipt of an engaging surface to the human thumb, the recess proximal to the first end of the body, the oval recess having a major axis co-linear with the longitudinal axis. The top face further includes an ellipsoidal aperture proximal to the second end of the body, the aperture having a major axis co-linear with the longitudinal axis of the body. The elongate body of the kitchen article handle further includes a rounded bottom face including a recess at the first end, having a major axis transverse to the longitudinal axis of the body, and proportioned for receipt of an engaging surface of a human finger when such finger is positioned transversely to the thumb. The bottom face also includes an ellipsoidal recess proximal to the free end, of the body, the recess having a major axis co-linear to the axis of the body, the ellipsoidal recess having major and minor axes of smaller dimensions than corresponding axes of the recess of the first end of the bottom face, the ellipsoidal recess in integral communication with the ellipsoidal aperture of the top face of the body.

10 Claims, 6 Drawing Sheets

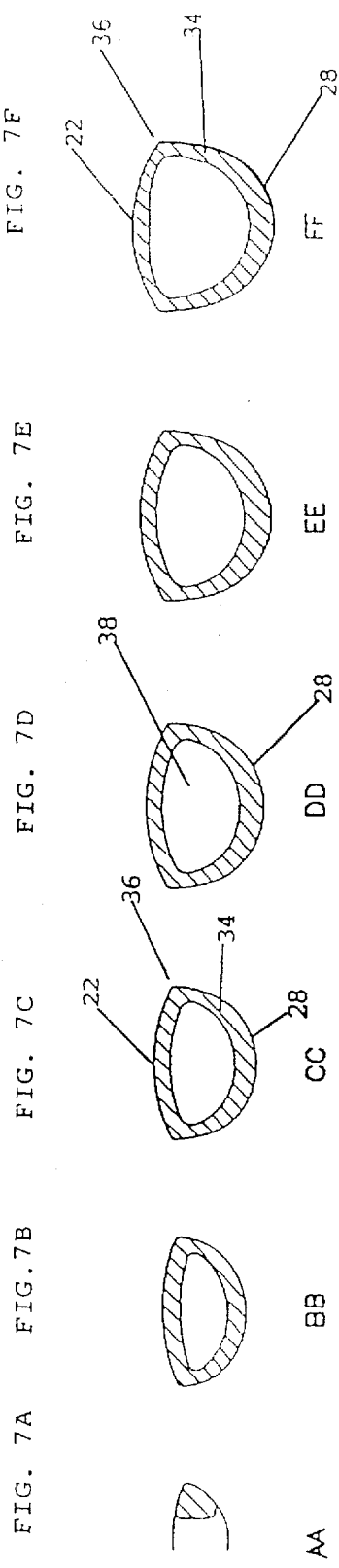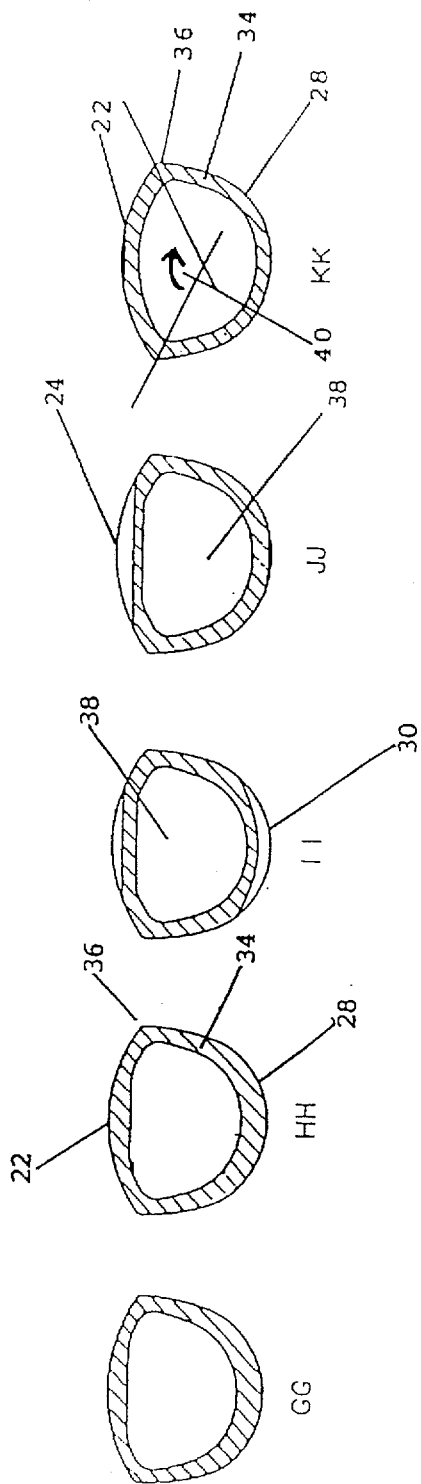

ERGONOMIC HANDLE FOR KITCHEN ARTICLES

BACKGROUND OF THE INVENTION

The instant invention relates to handles for the gripping of kitchen articles such as spatulas, slotted spoons, ladles, spaghetti servers, potato mashers and certain pans including sauce and frying pans.

An awareness has existed in the art of handles for kitchen articles since at least the year 1944 in which U.S. Pat. No. 2,345,248 to Farber describes a kitchen article handle in which the lower face of the handle includes a central concave part in the form of an arc defining a transverse housing in which four fingers may be therein accommodated. Also, accommodation is provided therein for the thumb on a lateral handle face. As such, the handle of Farber is adapted to a grip in which the thumb is on the side of the handle. Therein, the force required for holding the kitchen article is borne partially by friction forces of the fingers on the side faces of the handle. The result thereof is that holding the kitchen article requires appreciable force to produce said lateral friction and, resulting, the wrist is in an orientation which is not favorable for the making of tipping movements from a transverse axis thereof.

The art of such handles for kitchen articles is further represented in U.S. Pat. No. 4,038,717 (1977) to Bennett which represents improvement over Farber.

U.S. Pat. No. 4,926,521 (1990) to Gagnepain particularly addresses the need for an ergonomic handle in connection with kitchen articles such as sauce pans, braising pans and frying pans. For such application, Gagnepain provides an improved grip of the handle for users of kitchen articles, such that the grip of the handle is better adapted to accommodate particular forces which appear between the hand of the user and the handle during movements which are imparted to the article during the normal use of such pans.

A consideration, observed by the inventor, in of the design for any ergonomic handle for any kitchen is that the article, the shape of the handle must be particularly suited to usages in which, for each position of use, the user's thumb is longitudinally upon the upper face of the handle and his other fingers in opposition are transversely under the lower face thereof. It may, thereby, be appreciated that a goal of such ergonomic handles is to optimize the position of the hand and fingers thereof for supporting of the article and the countering of forward tipping forces imparted either by the mass of the kitchen article or by the mass of the cooking or comestible product to be maneuvered by the kitchen article. Therein, the wrist joint is naturally disposed in an orientation making it possible to limit downward tipping of the article with minimal muscular effort as well as rendering possible an appreciable angular movement of the wrist joint to impart to the kitchen article necessary upward tipping movements. Thereby, the forces for holding the kitchen article are borne by compression forces upon the fingers which engage the upper and lower faces of the handle.

Using such principles the present invention provides a particular application thereof with primary reference to lighter kitchen articles such as spatulas, slotted spoons, ladles, spaghetti servers, potato mashers and small pans, whether such pans are made of a thermoplastic or a stainless steel base. The instant invention may therefore be viewed as a response to the long felt need in the art for an ergonomic handle having particular application with respect to this class of kitchen articles.

As a further consideration, it is necessary that any such ergonomic handle for kitchen articles exhibit appropriate aesthetic appeal. Accordingly, any practical suggestion for an ergonomic handle, intended for mass marketing (as opposed to professional use by chefs), must integrate considerations of aesthetics with the above set forth criteria of functionality. The present invention provides such an integration of aesthetic and functional needs for lighter kitchen utensils set forth above.

SUMMARY OF THE INVENTION

The present invention relates to a handle for kitchen articles, the handle comprising a hollow elongate body including a longitudinal axis thereof, said body having a first end for providing attachment and connection of said kitchen articles into a hollow interior of said body, and which includes a second or free end thereof. Said elongate body of said kitchen handle includes a top face including a substantially oval recess proportioned for receipt of an engaging surface to the human thumb, said recess proximal to said first end of said body, said oval recess having a major axis co-linear with said longitudinal axis of said body. Said top face further includes an ellipsoidal aperture proximal to said second end of said body, said aperture having a major axis co-linear with said longitudinal axis of said body. The elongate body of the kitchen article handle further includes a round bottom face including a recess near to said first end, said recess having a major axis transverse to said longitudinal axis of said body, said recess proportioned for receipt of an engaging surface of a human finger when such finger is positioned transversely to the thumb. Said bottom face also includes an ellipsoidal recess proximal to said free end of said body, said recess having a major axis co-linear to said axis of said body, said ellipsoidal recesses having major and minor axes of smaller dimensions than corresponding axes of said recess of said first and of said bottom face, said ellipsoidal recess in integral communication with said ellipsoidal aperture of said top face of said body.

Further, said elongate handle body is tapered, from said first end to said second end thereof, such tapering occurring both in a plane transverse to said top and bottom faces and in a plane, between said top and bottom faces, substantially parallel with both of said faces. The use of said ellipsoidal and oval elements affords advantages of both function and appearance as is more fully set forth below.

It is accordingly an object of the present invention to provide an ergonomic handle for kitchen articles including, without limitation, spatulas, slotted spoons, ladles, spaghetti servers, potato mashers, and light pans.

It is another object of the invention to provide a handle having improved gripping characteristics than handles known in the art.

It is a further object to provide an ergonomic kitchen article that is particularly functional and aesthetic, and is adapted for gripping by the thumb, forefinger and other fingers of a user.

It is a yet further object of the invention to provide a single specification ergonomic handle usable with a variety of different kitchen utensils.

The above and yet other objects and advantages of the present invention will become apparent from the hereinafter set forth Brief Description of the Drawings, Detailed Description of the Invention and claims appended herewith.

3

Figures 1, 2:
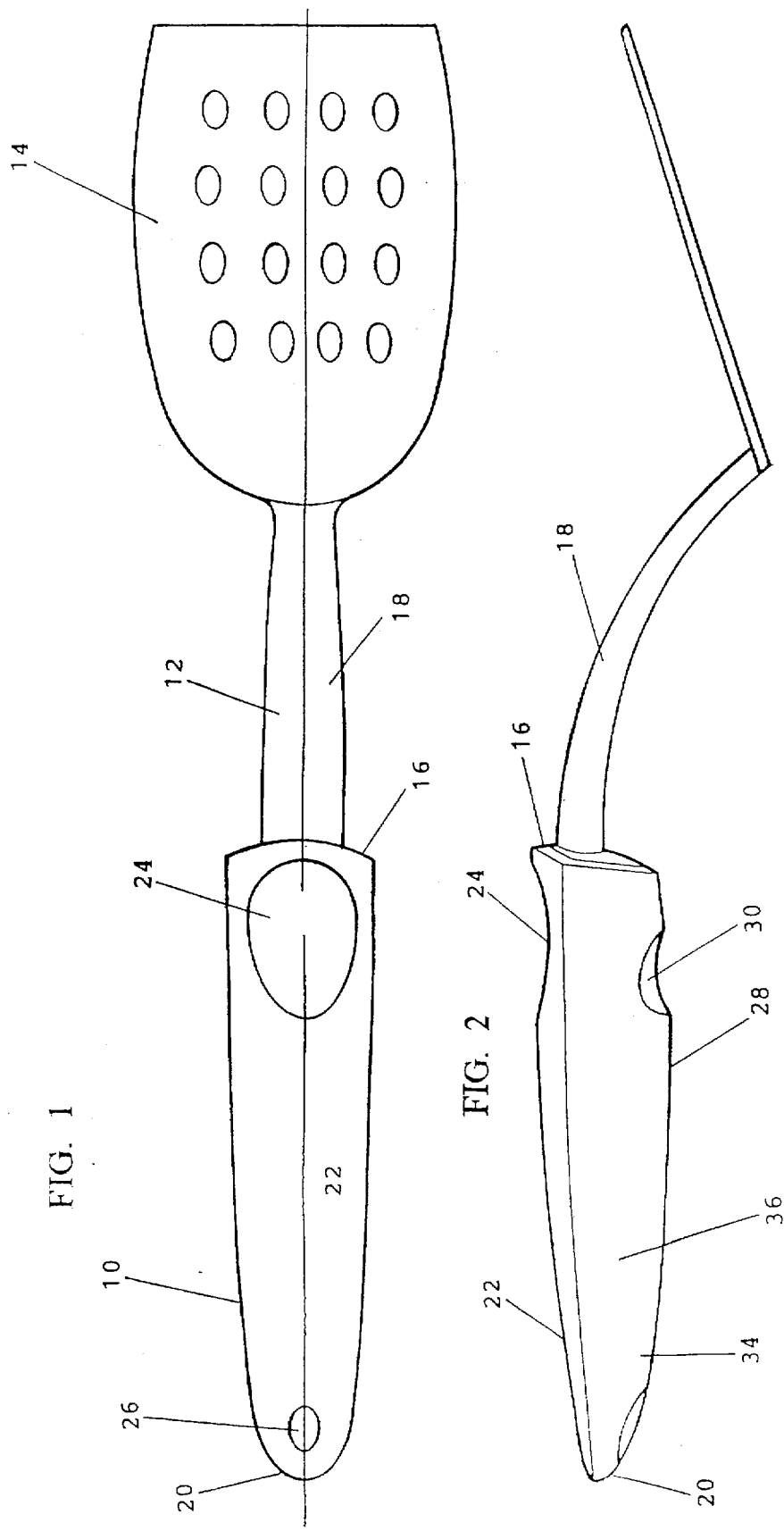
FIG. 1 is a top plan view of the inventive ergonomic handle for kitchen articles.

FIG. 2 is a side elevational view thereof.

Figure 3:
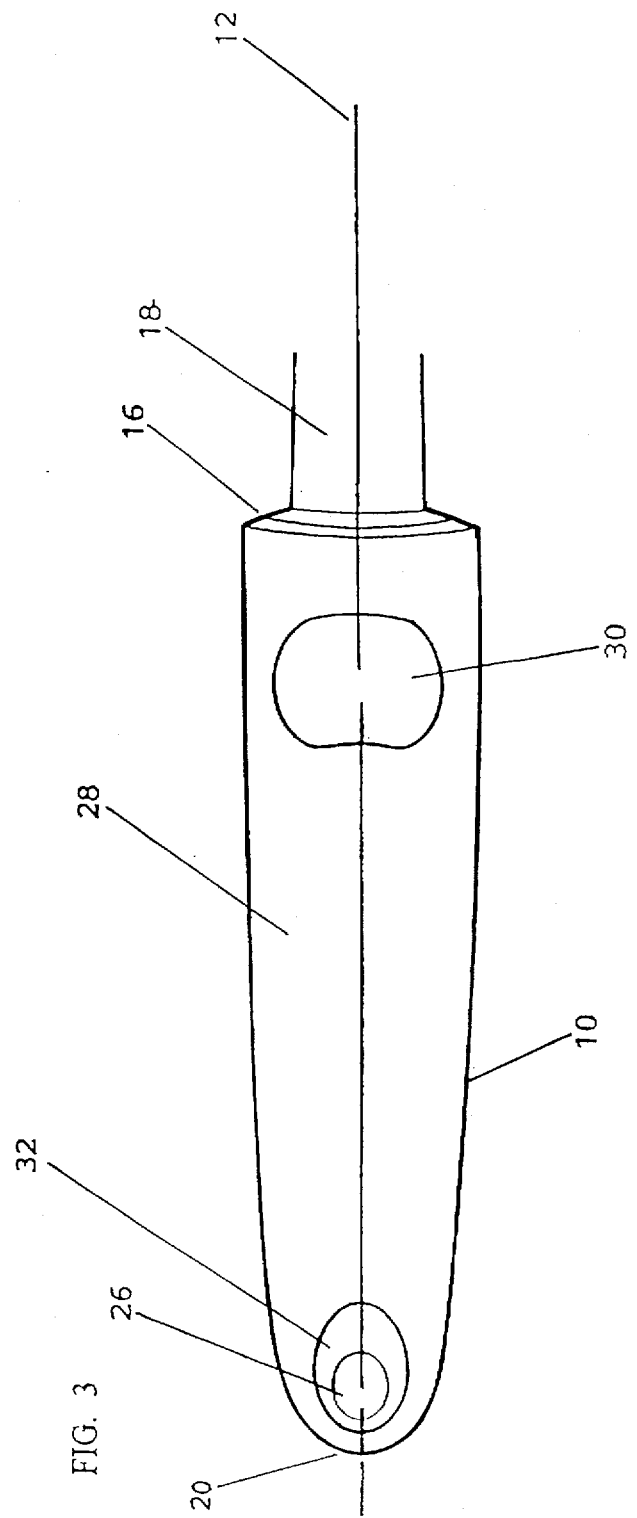

FIG. 3 is a bottom plan view of the inventive handle.

Figure 4:
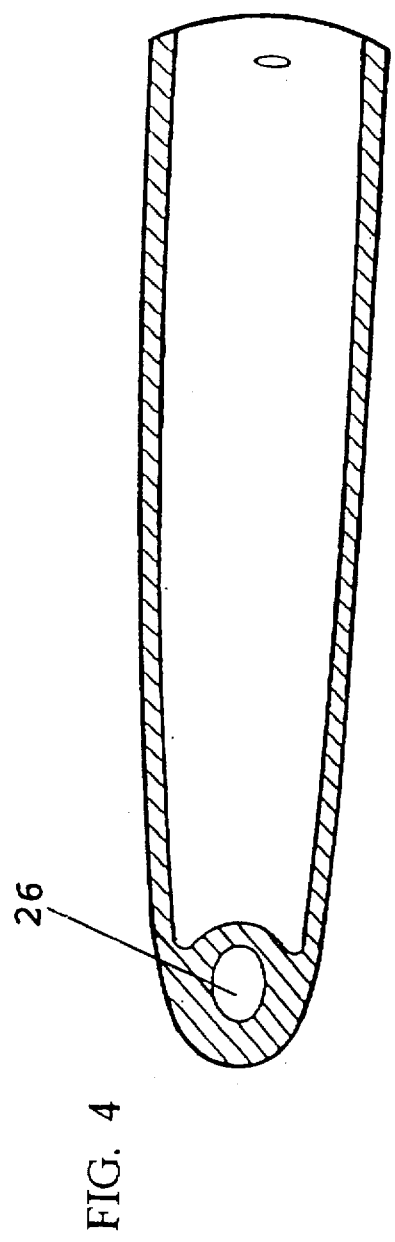

FIG. 4 is a horizontal cross-sectional view taken between the upper and lower faces of the handle.

Figure 5:
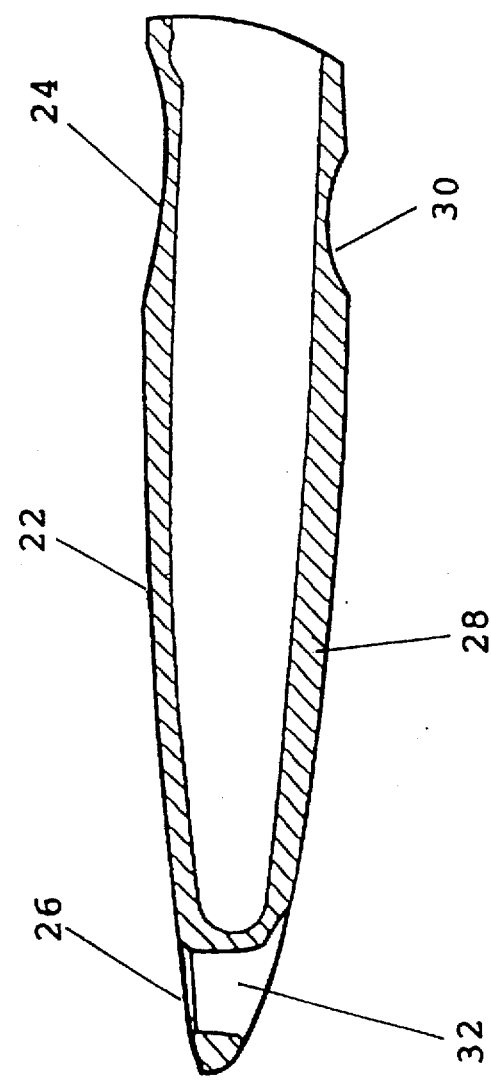

FIG. 5 is a vertical cross-sectional view taken along the longitudinal axis thereof.

Figure 6:
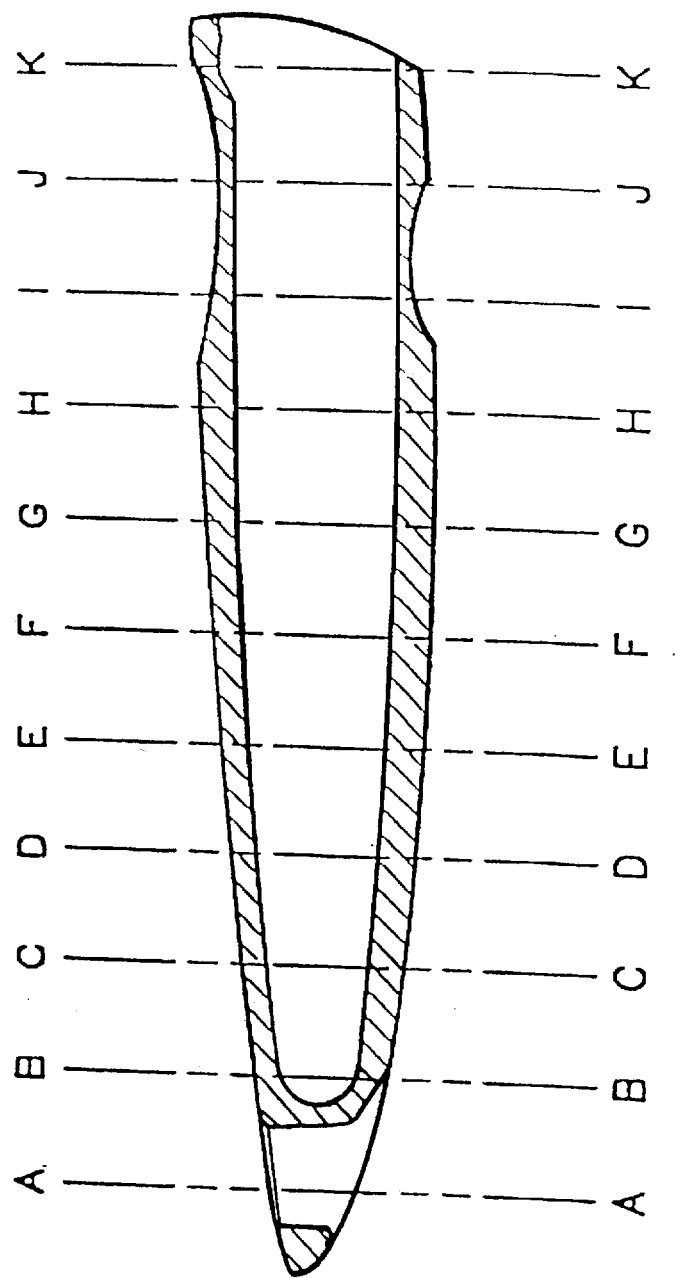

FIG. 6 is a view, similar to the view of FIG. 5, however showing the location of radial cross-sections AA thru KK thereof.

FIG. 7 is a composite view of radial cross-sections AA thru KK taken along respective lines AA thru KK of FIG. 6.

Figure 8:
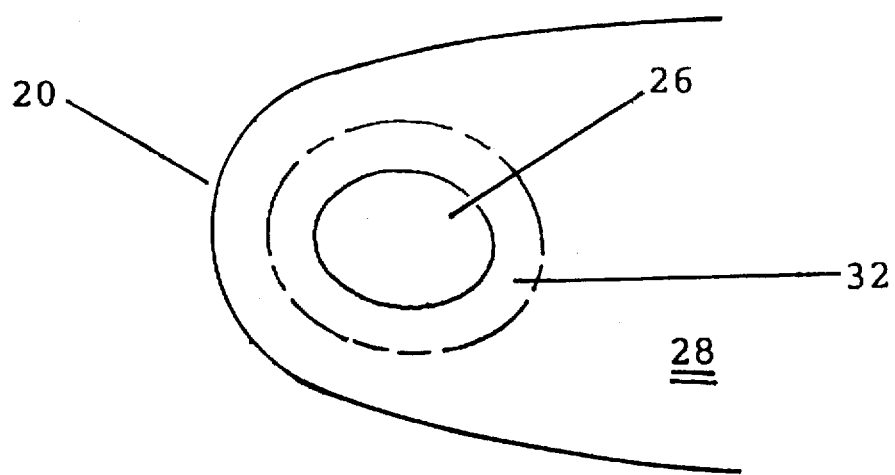

FIG. 8 is a bottom enlarged view of the ellipsoidal proximal bottom recess shown in FIG. 3.

Figure 9:
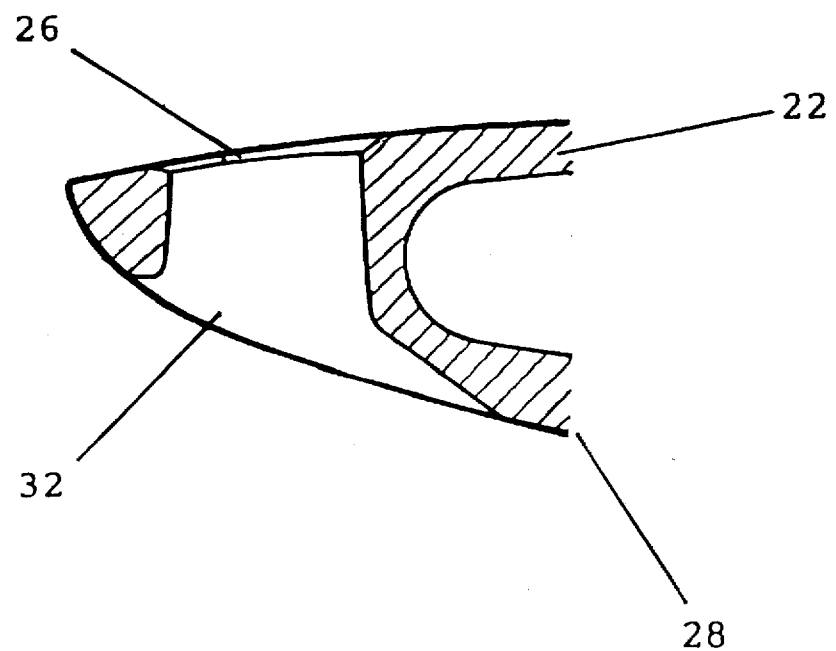

FIG. 9 is an enlarged vertical longitudinal cross-sectional view of the proximal ellipsoidal recess of FIG. 5.

DETAILED DESCRIPTION OF THE INVENTION

With reference to the top plan view of FIG. 1, the instant inventive ergonomic handle for kitchen articles may be seen to include a hollow elongate body 10 disposed upon a virtual longitudinal axis 12 which axis also extends through the center of gravity of the kitchen article 14 to be secured to the handle 10.

As may be further noted (see also FIGS. 2 and 3), said elongate body includes a first end 16 for providing attachment and connection of the handle 10 with the functional forward end of the kitchen article 14. It is, thereby, to be appreciated that handle 14 includes a hollow interior (see FIGS. 4 and 5) which is designed to accommodate an extension portion (not shown) of neck 18 of the kitchen article. It is, thereby, to be appreciated that the present inventive ergonomic handle is designed for press-fittable permanent secure attachment to such an extension portion of neck 18 of the kitchen article 14 into body 10.

As may be further noted in FIGS. 1 to 5, said elongate body also includes a second end 20 which comprises a second or free end of the elongate body 10.

With further reference to said figures, the elongate body may be seen to include a top face 22 which includes substantially oval recess 24 which is proximal to said first end 16 of the elongate body. As may be noted in the views of FIGS. 1 and 5, said oval recess 24 is proportioned for receipt of an engaging surface of a human thumb. Further, the major axis of said oval recess is co-linear with said longitudinal axis 12 of the inventive handle and its associated kitchen article 14.

With further reference to FIGS. 1 and 4, said top face 22 may be seen to further include an ellipsoidal aperture 26 which is near to said second or free end 20 of the body 10. Said aperture 26, like said oval recess 24, is defined by a major axis which is co-linear with the longitudinal axis 12 of the combined handle and kitchen article.

With further reference to the view of FIGS. 2, 3 and 5, the elongate body of the ergonomic handle may be seen to include a bottom face 28 which itself includes a recess 30 near to said first end 16 of the body 10. As may be seen in the view of FIG. 3, said recess 30 exhibits a longitudinal axis which is transverse to the longitudinal axis 12 of the body 10. Further, said recess 30 is proportioned for receipt of an engaging surface of a human finger, typically the fourth finger, when it is positioned transversely to the axis of the thumb of the user.

As may be further noted in the bottom view of FIG. 3, bottom face 28 further includes an ellipsoidal recess 32

4 located near said free end 20 of the body 10, said recess having a major axis which is co-linear with said axis 12 of the ergonomic handle. However, as may be noted, both the major and minor axis of said ellipsoidal recess 32 are smaller than the corresponding major and minor axes of said oval recess 24 of top face 10.

As may be noted in the views of FIGS. 3 and 5, said ellipsoidal recess 32 is vertically integral with ellipsoidal aperture 26 of the top face and thereby provides a vertical void, formed by the combination of aperture 26 and recess 32, by which handle 10 may be readily hung or stored on a nail, prong or the like.

It is to be further noted that the handle body 10 is tapered, from said first end 16 to said second end 20, both in a plane transverse to said top and bottom faces (see FIGS. 5 and 6) and in a plane between said top and bottom faces which is substantially parallel thereto (see FIG. 4). As may be appreciated by a comparison of FIGS. 4 and 5, the degree of taper is much greater in the plane of FIG. 5 than in the plane of FIG. 4.

The instant inventive design is also characterized by the existence of curved sidewalls 34 which represent extensions of bottom face 28. Resultingly, handle 10 exhibits a substantially flat top face 10 and a curved bottom face which is defined by the combination of lower face 28 and curved lateral extensions 34 thereof which intersects top face 22 at longitudinal lines 36. See FIGS. 2 and 7. The relationship between substantially flat top surface 22 and substantially curved lower surface 28 may be best seen with reference to the eleven progressive radial cross-sectional views AA thru KK shown in FIG. 7. Therein there may be also seen the interior void space 38 into which extension (not shown) of neck 18 of the kitchen article 14 may be seen. Also, with respect to Section KK shown in FIG. 7, it may be noted that top face 22 subtends an angle 40 of about 125 degrees relative to the entire 360 degrees subtended by the combination of top face 22, bottom face 28 and integral side walls 34 thereof.

An enlarged view of the ellipsoidal recess 32 is shown in FIG. 8. FIG. 9 is an enlarged cross-sectional view of the aperture 36 and recess 32 shown at the left of FIG. 5.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the claims appended herewith.

Having thus described my invention what I claim as new, useful and non-obvious and, accordingly secure by Letters Patent of the United States is:

1. An ergonomic handle for a kitchen article, the handle comprising an elongate body, including a longitudinal axis, said body having a first end for providing attachment and connection of said articles into a hollow cavity therewithin, said body also having a second or free end thereof, in which said elongate body comprises:

(a) a top face including:
      (i) a substantially oval recess proportioned for receipt of an engaging surface of a human thumb, said recess proximal to said first end of said body, said oval recess having a longitudinal axis co-linear with said longitudinal axis of said body, and
      (ii) an ellipsoidal aperture proximal to said free end, said aperture having a major axis co-linear with said longitudinal axis of said body; and (b) a bottom face curved within cross-sections of said body normal to said longitudinal axis of said body, said bottom face including:
  (i) a recess proximal to said first end, said recess having a major axis transverse to said longitudinal axis of said body, said recess proportioned for receipt of an engaging surface of a human finger when positioned transversely to said thumb; and
  (ii) an ellipsoidal recess proximal to said free end of said body, said recess having a major axis co-linear with said longitudinal axis of said body, said ellipsoidal recess having major and minor axes of smaller dimension than corresponding axes of said recess of said first and of said bottom face, said ellipsoidal recess in integral communication with said ellipsoidal aperture of said top face, further in which said elongate handle body is tapered, from said first end to said second end, both in a plane transverse to said top and bottom faces, and in a plane between said top and bottom faces and substantially parallel therewith, in which the degree of taper from the first end to second end is greater in said transverse plane.

2. The handle as recited in claim 1, in which said proximal recess of said bottom face curves, at ends of its major axis, onto curved lateral side walls of said bottom face of said elongate body.

3. The ergonomic handle as recited in claim 2, in which a center-to-center distance between said oval recess of said top face and said ellipsoidal aperture thereof is in a range of about 10 centimeters to about 13 centimeters.

4. The handle as recited in claim 3, in which a preferred said center-to-center distance thereof is about 11.5 centimeters.

5. The handle as recited in claim 2, in which a radial cross-section of said top face subtends an angle of about 125 degrees and a radial cross-section of said bottom face and its curved sidewalls subtends an angle of about 235 degrees.

6. The handle as recited in claim 2, in which a ratio of taper of said transverse plane from said first end to said second end between said oval recess of said aperture is about three-to-one.

7. The handle as recited in claim 2, in which a ratio of taper of said parallel plane from said first end to said second end between said oval recess of said aperture is about eight-to-five.

8. The ergonomic handle as recited in claim 1, in which said top face is substantially flat.

9. The handle as recited in claim 8, in which a center-to-center distance between said recesses of said lower face is in a range of about 9 to about 12 centimeters.

10. The handle as recited in claim 9, in which a preferred said center-to-center distance is about 10.4 centimeters.

* * * * *